Patented July 6, 1937

2,086,428

UNITED STATES PATENT OFFICE 2,086,428

METHOD OF PRINTING AND WAXING

Walter W. Mock, Rutherford, N. J., assignor to The International Printing Ink Corporation, New York, N. Y., a corporation of Ohio No Drawing. Application October 6, 1933, Serial No. 692,421

4 Claims. (Cl. 91—67.9)

This invention relates to the marking and decorating of paper or other articles to be coated with hot wax and more particularly to the printing of such articles.

It has been the practice in the marking of such surfaces to apply the ink by type-printing, using as a binder a processed, vegetable, drying-oil with a drier. Such an ink requires a long time to dry, before the wax can be applied. In my co-pending application, Serial No. 581,988 (U. S. Patent 2,081,949), there is described a method of printing with a printing ink which contains coloring matter dispersed in a solution of a tenacious, solid binder dissolved in a non-aqueous liquid solvent, and then diluting the solvent in the film on the article with melted wax which is compatible with said solvent and is a non-solvent for said binder and the coloring matter, to precipitate or coagulate said binder to produce a hard adhesive non-smearing film occluding the coloring matter. The binder specifically described in my aforesaid application is nitrocellulose.

It has now been found that certain resins give unusually good results when used as binders in inks to be coated with hot wax and that the film resulting from such an ink will not bleed into the hot wax and will contain more binder so that it possesses more "tack" and, therefore, will "lay" better than inks using cellulose esters as the binder. Other resins commonly used in intaglio inks, such as gilsonite, Batu gum and dammar gum, which are soluble in hot paraffin, are not suitable for use in the improved inks.

As examples of resins suitable for this purpose are certain alkyd type resins, which are condensation products of glycerine, fatty acids and phthalic anhydride, the polymerized vinyl compounds, phenol-formaldehyde condensation products and amide-formaldehyde condensation products. Certain alcohol soluble natural gums, such as manilla gum and shellac, may also be used for this purpose.

Amberol K-12A is a specific example of a suitable synthetic resin. It is the product of the condensation of phenol and formaldehyde in the presence of natural rosin and has an acid value of from 100 to 120 and a melting point of from 130 to 148° C. Rezyl No. 114, which is an alkyd type of synthetic resin made by condensing together Chinawood oil, glycerine, phthalic anhydride, and which has an acid value of 28 to 38, a softening point of 52 to 59° C. and a specific gravity of 1.14, is also suitable for this purpose.

The following are specific examples of intaglio inks suitable for this purpose, although it is not intended to limit the invention to the particular pigments, solvents and binders or the proportions of these examples. The ingredients are given in parts by weight and the color index number of the pigment is given.

*Example I*

|  | Parts |
|---|---|
| Prussian blue (1436) | 15 |
| A Rezyl varnish | 40 |
| Amberol K-12A | 15 |
| Commercial toluol | 30 |
| Total | 100 |

The A Rezyl varnish referred to above is a 50–50 mixture of Rezyl No. 114 and benzol.

*Example II*

|  | Parts |
|---|---|
| Lithol barium toner (189) | 10 |
| B Rezyl varnish | 20 |
| Amberol K-12A | 30 |
| Benzol | 40 |
| Total | 100 |

The B Rezyl varnish referred to above is a 50–50 mixture of Rezyl No. 114 and commercial toluol.

*Example III*

|  | Parts |
|---|---|
| Chrome yellow (1270) | 45 |
| A Rezyl varnish | 25 |
| Amberol K-12A | 15 |
| Benzol | 15 |
| Total | 100 |

The important characteristics of the solvents referred to above are:

| Solvent | Origin | Sp. Gr. | Boiling range |
|---|---|---|---|
| Benzol | Coal tar | .875 | At least 90% at 100° C.—all below 120° C. |
| Toluol | Coal tar | .864 | 100% within 2° C. of 110.4° C. |

The above inks may be applied by the intaglio or Rotogravure process in the usual manner. In that process an excess of intaglio ink, which is very liquid (about the viscosity of kerosene), is applied to a surface, the design to be printed being etched into the surface. The excess ink is then wiped off and the ink which is retained in the cells prints the design upon the paper or other material contacting with the surface.

Type-printing inks may also be produced as follows:

Example IV

|  |  | Parts |
|---|---|---|
| Lithol barium toner | T-263 | 80 |
| Lithol sodium toner | T-223 | 200 |
| Blanc fixe | W-5 | 560 |
| Lithopone | W-54 | 220 |
| Chrome orange | V-64 | 50 |
| C Rezyl varnish |  | 520 |
| Santolite varnish |  | 300 |
| Dimethyl phthalate |  | 85 |
| Total |  | 2015 |

Example V

|  |  | Parts |
|---|---|---|
| Milori blue | R-105 | 26 |
| Permanent purple toner | R-103 | 14 |
| Blanc fixe | W-5 | 64 |
| C Rezyl varnish |  | 64 |
| Santolite varnish |  | 30 |
| Dimethyl phthalate |  | 10 |
| Total |  | 208 |

The varnishes referred to above are made by heating and agitating the resin with the non-volatile solvent in the following proportions:

C Rezyl varnish

|  | Parts |
|---|---|
| Rezyl No. 114 | 900 |
| Dimethyl phthalate | 735 |
| Total | 1635 |

Santolite varnish

|  | Parts |
|---|---|
| Santolite M. H. P. | 500 |
| Dimethyl phthalate | 500 |
| Total | 1000 |

The Santolite M. H. P. is a toluenesulphoamide-formaldehyde condensation product having an acid number of 0, a softening point of about 82° C. and a specific gravity of about 1.37.

With either the intaglio inks or the type printing inks the hot wax may be applied to the printed or coated surface while the ink is still wet. The solvent, which is miscible in the hot wax, will be quickly absorbed and precipitate the resin binder with the occluded coloring material. The hot wax is preferably applied by dipping the printed or coated surface in a bath of molten wax or the hot wax may be sprayed or brushed onto the surface.

The resin binders to be used in the above inks should be substantially insoluble in petroleum hydrocarbons or hot wax, although they may be dilutable with volatile petroleum hydrocarbons (members of the paraffin series). They should preferably have a melting point not lower than 250° F. although in some instances a binder having a lower melting point may be used. They should also be soluble in solvents which are miscible with or absorbed by the wax and must, of course, possess the qualifications making them suitable for the printing, which qualifications are well known. Another example of such resins is Lewisole #2 which is a modified phenolic condensation product. The resin used may be mixed with nitrocellulose or other cellulose esters to produce a binder.

The suitability of the resin binder (as to solubility) may be tested by dissolving a sample of it in a solvent which is miscible with the hot wax and adding molten paraffine to the solution. If the binder is precipitated it is suitable, providing it has the other characteristics required of a binder in the printing process in which it is to be used, which characteristics are well known.

Other solvents than those given above and which are miscible with or soluble in and will be absorbed by the hot wax, may be used; for example, commercial xylol, or cumene, ordinary alcohol, dibutyl phthalate, etc. may be substituted for the solvents given. Also, other pigments may be used, but the pigments should be ones which are insoluble in the binder, the solvent and hot paraffin wax.

The terms which have been used in describing this invention have been used in their descriptive sense and not as terms of limitation, and it is intended that all equivalents thereof be included within the scope of the description and the appended claims.

What I claim is:

1. The method which consists in printing on an article with a printing ink which does not dry on the press and which contains coloring matter dispersed in a solution of a tenacious solid resin dissolved in a non-aqueous non-volatile liquid solvent, and immediately after printing diluting the said solvent in the printed film of said ink with melted wax which is compatible with said solvent and is a non-solvent for said resin and the coloring matter to precipitate or coagulate said resin to produce a hard adhesive non-smearing film occluding the coloring matter.

2. The method which consists in dissolving a tenacious solid resin in a non-aqueous liquid solvent and mixing a pigment in said solution to provide a printing ink, printing a film of said pigmented solution upon an article, and then diluting the said solvent in the film on the article with melted wax which is compatible with said solvent and is a non-solvent for the resin to precipitate or coagulate the resin to produce a hard adhesive non-smearing film occluding the pigment.

3. The method which consists in printing on an article with a printing ink which contains coloring matter dispersed in a solution of a tenacious, solid resin dissolved in a non-aqueous, liquid solvent, and then diluting the solvent in the film on the article with melted wax which is compatible with said solvent and is a non-solvent for said resin and the coloring matter, to precipitate or coagulate said resin to produce a hard adhesive non-smearing film occluding the coloring matter.

4. The method which consists in printing on an article with a printing ink which contains coloring matter dispersed in a solution of a tenacious, solid resin dissolved in a non-aqueous, liquid solvent, said resin being selected from the class consisting of modified phenol-formaldehyde condensation products, alkyd synthetic resins which are condensation products of fatty acids, glycerine and phthalic anhydride, and polymerized vinyl compounds, and then diluting the solvent in the film on the article with melted wax which is compatible with said solvent and is a non-solvent for said resin and the coloring matter, to precipitate or coagulate said resin to produce a hard adhesive non-smearing film occluding the coloring matter.

WALTER W. MOCK.